(12) United States Patent
Ponzi (10) Patent No.: US 12,312,269 B2
(45) Date of Patent: May 27, 2025

(54) GREY WATER TREATMENT AND RECYCLING SYSTEM, GREY WATER TREATMENT AND RECYCLING PROCESS, SYSTEM CONTROL METHOD

(71) Applicant: DFM DEPANNAGES FOURNITURES MAINTENANCE, Villepinte (FR)

(72) Inventor: Bruno Ponzi, Senlis (FR)

(73) Assignee: DFM DEPANNAGES FOURNITURES MAINTENANCE, Villepinte (FR)

( * ) Notice: Subject to any disclaimer, the term of this patent is extended or adjusted under 35 U.S.C. 154(b) by 408 days.

(21) Appl. No.: 17/763,523

(22) PCT Filed: Oct. 9, 2020

(86) PCT No.: PCT/EP2020/078379
§ 371 (c)(1),
(2) Date: Mar. 24, 2022

(87) PCT Pub. No.: WO2021/069644
PCT Pub. Date: Apr. 15, 2021

(65) Prior Publication Data
US 2022/0363578 A1  Nov. 17, 2022

(30) Foreign Application Priority Data
Oct. 10, 2019  (FR) .................................... 1911285

(51) Int. Cl.
*B01D 21/24*  (2006.01)
*C02F 1/00*  (2023.01)
(Continued)

(52) U.S. Cl.
CPC ............ *C02F 9/00* (2013.01); *B01D 21/2438* (2013.01); *C02F 1/008* (2013.01); *C02F 3/006* (2013.01);
(Continued)

(58) Field of Classification Search
None
See application file for complete search history.

(56) References Cited

U.S. PATENT DOCUMENTS 4,765,906 A * 8/1988 Downing ............... B01D 29/58
                                                       210/651
5,374,356 A * 12/1994 Miller .................... B01D 17/12
                                                       210/651
(Continued)

FOREIGN PATENT DOCUMENTS

CA    2 797 686 A1    5/2014
EP    1 151 967 A1   11/2001
(Continued)

OTHER PUBLICATIONS

International Search Report as issued in International Patent Application No. PCT/EP2020/078379, dated Dec. 21, 2020.
(Continued)

*Primary Examiner* — Jonathan M Peo
(74) *Attorney, Agent, or Firm* — Pillsbury Winthrop Shaw Pittman LLP (57) ABSTRACT

A system for treating and/or recycling gray water includes a first receiving tank for gray water, a second receiving tank for treated water and a fluidic treatment circuit between the first and second receiving tanks. The first receiving tank includes an element for oxygenating the water in the first receiving tank and a system adapted to deliver enzymes into the first receiving tank. The fluidic treatment circuit includes a filtration unit, a microfiltration unit including at least one
(Continued)

microfilter, a disinfection unit and a membrane ultrafiltration unit.

20 Claims, 3 Drawing Sheets (51) Int. Cl.
| | |
|---|---|
| *C02F 1/02* | (2023.01) |
| *C02F 1/32* | (2023.01) |
| *C02F 1/44* | (2023.01) |
| *C02F 1/50* | (2023.01) |
| *C02F 1/74* | (2023.01) |
| *C02F 3/00* | (2023.01) |
| *C02F 3/34* | (2023.01) |
| *C02F 9/00* | (2023.01) |
| *C02F 103/00* | (2006.01) |

(52) U.S. Cl.
CPC *C02F 1/02* (2013.01); *C02F 1/32* (2013.01); *C02F 1/444* (2013.01); *C02F 1/50* (2013.01); *C02F 1/74* (2013.01); *C02F 3/342* (2013.01); *C02F 2103/002* (2013.01); *C02F 2201/005* (2013.01); *C02F 2209/005* (2013.01); *C02F 2209/03* (2013.01); *C02F 2209/42* (2013.01); *C02F 2301/046* (2013.01); *C02F 2303/04* (2013.01)

(56) References Cited

U.S. PATENT DOCUMENTS

| | | | |
|---|---|---|---|
| 8,133,385 | B2 | 3/2012 | Premathilake et al. |
| 9,868,658 | B2 * | 1/2018 | Kistner .................. C02F 3/342 |
| 2003/0094412 | A1 | 5/2003 | Jungbauer |
| 2010/0292844 | A1 | 11/2010 | Wolf |
| 2011/0036760 | A1 | 2/2011 | Retolaza et al. |
| 2014/0059754 | A1 * | 3/2014 | Hermon .................. C02F 1/444 |
| | | | 4/318 |

FOREIGN PATENT DOCUMENTS

| | | |
|---|---|---|
| EP | 2 664 584 A1 | 11/2013 |
| EP | 2 703 358 A1 | 3/2014 |
| FR | 2 694 282 A1 | 2/1994 |

OTHER PUBLICATIONS

First Substantive Examination Report as issued in Saudi Arabian Patent Application No. 522432162, dated Feb. 3, 2025.

* cited by examiner

GREY WATER TREATMENT AND RECYCLING SYSTEM, GREY WATER TREATMENT AND RECYCLING PROCESS, SYSTEM CONTROL METHOD

CROSS-REFERENCE TO RELATED APPLICATIONS

This application is the U.S. National Stage of PCT/EP2020/078379, filed Oct. 9, 2020, which in turn claims priority to French patent application number 1911285 filed Oct. 10, 2019. The content of these applications are incorporated herein by reference in their entireties.

FIELD OF THE INVENTION

The field of the invention relates to systems for treating and/or recycling gray water, in particular for their re-use for certain domestic applications. The field of the invention also relates to the field of gray water treatment and/or recycling methods. More particularly, the field of the invention relates to that of the organization and of the optimization of the fluidic circuit for the treatment of gray water.

PRIOR ART

Gray water is polluted domestic water coming from domestic use such as showers, wash basins, washing machines, stormwater or the water from a well. Gray water does not include, or in a negligible quantity, fecal matter or chemical pollutants such as medications and hydrocarbons.

Gray water can be treated in order to be re-used for domestic uses that do not require water that is absolutely clean such as for flushing toilets, watering, irrigation, washing cars, outdoor surfaces or floors.

However, treating gray water is not without constraints, it must in particular be possible to remove the hairs and hair from the water and the soapy products as well as all dust, microfauna and microflora.

Gray water batch reactors are known which consists of storing the gray water in a specific tank. As gray water is generally warm or hot, this increase in temperature can ensure the rapid development of a bacterial fauna that degrades fat, detergents and soaps.

A first disadvantage of these systems is that the degradation time is very long: between 14 and 21 days. A second disadvantage is that the polluting load is not entirely degraded and does not always reach the regulatory threshold limit.

The objective of the present invention is to provide a system for treating gray water that overcomes these disadvantages of the prior art. Another objective of the invention is to provide a system that makes it possible to treat gray water quickly and effectively. Another objective is to be able to provide a system for treating gray water that is automated and modulable in particular according to a possible breakdown or according to the volume of gray water received.

SUMMARY OF THE INVENTION

The invention relates to a system for treating and/or recycling gray water. Said system comprises a first receiving tank for gray water, a second receiving tank for treated water and a fluidic treatment circuit between the first and second tanks, characterized in that the first tank comprises an element for oxygenating the water in the first tank and a means for delivering enzymes into the first tank. The fluidic treatment circuit comprises a filtration unit, a microfiltration unit comprising at least one microfilter, a disinfection unit, and a membrane ultrafiltration unit.

In an embodiment, the fluidic treatment circuit (10) further comprises a plurality of pressure sensors (Pt1, Pt2, Pt3, Ma1, Ma2, Ma3) to transmit pressure information to an automatic control unit (COMP), at least one pressure sensor (Pt1, Pt2) being located upstream from the filtration unit (FIL) and at least one pressure sensor (Pt3, Ma2, Ma3) fluidically arranged between the filtration unit (FIL) and the ultrafiltration unit (UFIL), the automatic control unit (COMP) controlling the closure of a treatment line according to the threshold crossing of a pressure measured at one of the pressure sensors.

In an embodiment, the fluidic treatment circuit comprises furthermore a plurality of pressure sensors to transmit pressure information to an automatic control unit and/or the first tank comprises a level sensor to transmit filling information of the receiving tank to an automatic control unit. Said automatic control unit controls the closure of the fluidic treatment circuit according to the pressure and/or filling information.

In an embodiment, the fluidic treatment circuit comprises at least one pump and/or at least one solenoid valve controlled by said automatic control unit according to the pressure or filling formation transmitted.

In an embodiment, the fluidic treatment circuit comprises a pump controlled by said automatic control unit according to filling information of the receiving tank. The element for oxygenating and the means for delivering enzymes into the first tank can be controlled by the automatic control unit according to filling information of the first tank.

In an embodiment, the system comprises at least one fluidic return circuit for injecting treated water (2) coming from the second receiving tank for treated water into the first receiving tank and/or at an inlet of the fluidic treatment circuit.

In an embodiment, the at least one fluidic return circuit comprises a pump and/or a solenoid valve controlled by the automatic control unit according to the pressure information of the fluidic treatment circuit and/or according to filling information of the first tank.

In an embodiment, the fluidic treatment circuit comprises or is connected to one or several pumps in parallel.

In an embodiment, the fluidic treatment circuit comprises at least two microfiltration units and/or at least two disinfection units and/or at least two membrane ultrafiltration units in parallel.

In an embodiment, the system comprises an element for clarifying for removing the suspended materials in the first tank, in particular by the discharge of an overflow into a weir or by scraping.

The invention also relates to a method for treating and/or recycling gray water. Said method comprises the following steps:
- The receiving of a volume of gray water in a first tank;
- an oxygenation of said volume of gray water in the first tank;
- an injection of a volume of enzyme into said volume of received gray water;
- the pumping of a flow rate coming from said volume of gray water from the first tank to a fluidic treatment circuit; and
- a treatment of said flow rate in a volume of treated water.

The treatment step comprises:
- a first filtration of the flow rate through a filter making it possible to retain colloidal particles;

a second filtration of said flow rate through at least one microfilter;
a disinfection of said flow rate; and
a membrane ultrafiltration of said flow rate In an embodiment, the method further comprises a measurement of pressure in the fluidic treatment circuit by at least one pressure sensor (Pt1, Pt2) located upstream from the filter (FIL) and a measurement of pressure in the fluidic treatment circuit by at least one pressure sensor (Pt3, Ma2, Ma3) fluidically arranged between the filter (FIL) and a membrane ultrafiltration unit (UFIL); and a transmission of pressure information to an automatic control unit (COMP) controlling the closure of a treatment line according to the threshold crossing of a pressure measured at one of the pressure sensors.

The invention also relates to an automatic system control method according to the present invention by an automatic control unit (COMP) configured to take:
at least one measurement of the pressure of the flow rate (Q) in the fluidic treatment circuit (10);
at least one measurement of the filling rate of the first tank (30); and
a reinjection of a volume of treated water (2) into the fluidic treatment circuit (10) or into the first tank (20) according to pressure measurements of the flow rate (Q) and/or measurements of the filling rate.

The invention also relates to a computer program product that can be downloaded from a communication network and/or recorded on a data support that can be read by a computer and/or executed by a computer, comprising computer program code instructions for implementing the automatic control method according to the invention.

The invention finally relates to a data recording support, that can be read by a computer, whereon a computer program is recorded comprising program code instructions for implementing the automatic control method according to the invention.

BRIEF DESCRIPTION OF THE FIGURES

Other characteristics and advantages of the invention shall appear when reading the following detailed description, in reference to the accompanying figures, which show.

DETAILED DESCRIPTION

In the rest of the description, the following terms must be understood in light of their definition hereinafter:
"About" followed by a value means that said value comprises a range comprised around said value of more or less 10%.

The system comprises a first receiving tank for gray water and a second receiving tank for treated water.

The system comprises a fluidic treatment circuit, fluidically between the first tank and the second tank. The fluidic circuit comprises an inlet connected to the first tank, an outlet connected to the second tank and at least one pump for transporting the liquid from the first tank to the second tank. The fluidic treatment circuit comprises a filtration unit, a microfiltration unit comprising at least one microfilter, a disinfection unit, and a membrane ultrafiltration unit of the water coming from the first tank.

First Receiving Tank for Gray Water

The first receiving tank 30 for gray water is more particularly described hereinbelow in reference to FIG. 2.

The first receiving tank 30 for gray water is a container that makes it possible to store a liquid. The first tank 30 is intended for receiving the gray water coming from a domestic or collective installation, or that from a construction, building, even a factory. This list is not limiting.

The first tank 30 is connected to an inlet 31 of gray water. The gray water inlet 31 authorizes the discharge of the gray water coming from an installation into the first tank 30.

The first tank 30 makes it possible to store a first volume of gray water 1 and to carry out a first treatment of the latter.

The first tank 30 comprises a means for delivering enzymes ENZ into the first volume of gray water 1. The means for delivering enzymes ENZ can comprise an enzyme tank. The means for delivering enzymes ENZ can comprise a pump or a distributor for introducing the enzymes from the enzyme tank to the first tank 30. In an embodiment, the enzyme tank can comprise a first enzyme for the deterioration of soaps and/or a second enzyme for the deterioration of detergents and possibly foams.

The composition of the enzymes ENZ can depend on the type of installation to which the system 100 according to the invention will be connected. Indeed, when the system 100 is implemented in offices or other buildings that do not include a clothes washing machine, the delivery of enzyme for the deterioration of detergents can be filtered or not implemented.

Adding enzyme ENZ into a first volume of gray water 1 advantageously makes it possible to break down components such as soaps and detergents.

Indeed, gray water contains bacteria. Some of these bacteria are able to deteriorate soaps and detergents. The enzymes ENZ advantageously allow for the acceleration of the growth of bacteria and thus an effective deterioration of soaps and detergents.

Recall that the enzymes can be formed from globular proteins that act alone, such as lysozyme, or can be in complexes of several enzymes. The enzymes include one or several polypeptide chains folded to form a three-dimensional structure corresponding to their native state. The amino acid sequence of the enzyme determines the structure of the latter structure. The structure determines the catalytic properties of the enzyme. According to examples, the enzymes can for example be chosen according to the following list: amylase, lipase, oxydoreductase, pectinase or hemicellulase. Any other type of enzyme selected to achieve the sought function can be chosen, for example the function of deteriorating soaps. The concentration in the volume of enzyme injected into the first tank 30 can be configured to be in the range from [0.01 mg/L, 100 mg/L], preferably between [0.05 mg; 60 mg].

The first tank 30 comprises an element for oxygenating OXY. The element for oxygenating OXY can comprise a means for producing oxygen. The means for producing oxygen is connected to the lower portion of the first tank 30.

The element for oxygenating OXY makes it possible to load the first volume of gray water 1 with oxygen and to increase the concentration of dissolved oxygen in the first volume of gray water 1. Increasing the dissolved oxygen advantageously favors the development of the bacteria described hereinabove. The effectiveness of the deterioration of soaps and/or detergents is thus increased.

The element for oxygenating OXY preferably comprises an air outlet arranged under the level of liquid of the first tank. In an embodiment, the element for oxygenating OXY comprises an air inlet. The intake of air into the element for oxygenating OXY is carried out via aspiration. The element for oxygenating OXY preferably comprises a mixing chamber wherein the aspirated air is mixed with the gray water coming from the first tank.

Once the air and the water are mixed, they are injected into the first volume of gray water 1 by an outlet.

In an embodiment, the element for oxygenating comprises an immersed aerator.

The first tank 30 can also comprise a level sensor 37 of the tank. The level sensor 37 of the tank is configured to measure the filling rate of the first tank 30 or the volume present in the first tank 30. Preferably, the level sensor 37 is designed to detect when the volume of the first tank 30 reaches (in one direction or the other) a volume or a predetermined level.

The level sensor 37 can comprise a float detector or a float switch. In an embodiment, the float detector comprises a float attached to a link. The link is attached to the bottom of the first tank 30. Once the level of the gray water 1 reaches the length of the link, the float changes inclination, activating a switch.

In an embodiment, the first tank 30 comprises an element for clarifying. The element for clarifying is designed to remove the suspended materials from the first volume of the first receiving tank 30 for gray water.

In an embodiment, the element for clarifying comprises a means that makes it possible to remove a suspension layer from the first volume of gray water of the first tank.

Figure 2:
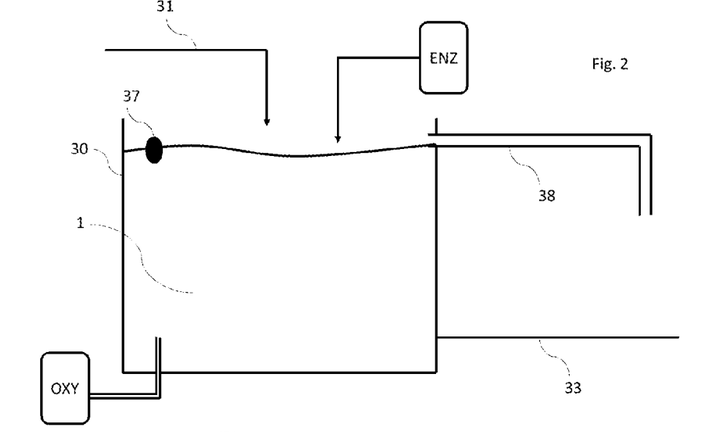
FIG. 2: a diagrammatical view of the first receiving tank according to an embodiment of the invention.

In an embodiment shown in FIG. 2, the element for clarifying comprises a weir 38 of an overflow of the first tank 30. The weir 38 can convey the suspended materials to a recovery container. Preferably, the weir 38 is connected to the sewer.

This weir 38 advantageously makes it possible, when the level of the first tank 30 reaches a predetermined level, to discharge the upper portion of the first volume of gray water 1 outside the first tank 30. This weir 38 advantageously makes it possible to extract the suspended materials without mechanical action from the first volume of gray water 1. This weir 38 also has the advantage of using the system 100 which minimizes the constraints at the level of receiving gray water. If the quantity of gray water received is excessive, the overflow is drained by the weir 38 and the first tank 30 cannot overflow.

In an alternative or cumulative embodiment, the element for clarifying comprises a scraper for scraping the portion in suspension of the first volume of gray water. Preferably, the element for clarifying comprises mechanical means to set the scraper in motion. These mechanical means advantageously allow for an automatic movement of the scraper driving the scraping of the upper portion of the first liquid in order to remove therefrom the suspended materials outside the first tank.

The element for clarifying can alternatively comprise means for aspirating the suspended materials from the first volume of gray water.

The first receiving tank 30 for gray water can comprise a stirrer. The stirrer is designed to mix the first volume 1 in the first tank 30. The mixing of the first volume advantageously makes it possible to accelerate the effect of the enzymes on the deterioration of soaps and detergents. Preferably, the stirrer is activated after the scraping operation of the suspended materials in such a way as to not rem ix the suspended materials in the first volume of the first receiving tank.

The first tank 30 further comprises a fluidic outlet 33. The fluidic outlet 33 advantageously allows for the flow of the first volume of gray water 1. The fluidic outlet 33 of the first tank 30 can comprise a means for flowing of a fluid such as an outlet pipe. The fluidic outlet 33 is fluidically connected to the fluidic treatment circuit or to the pumping line.

Pumping Lines

Figure 1:
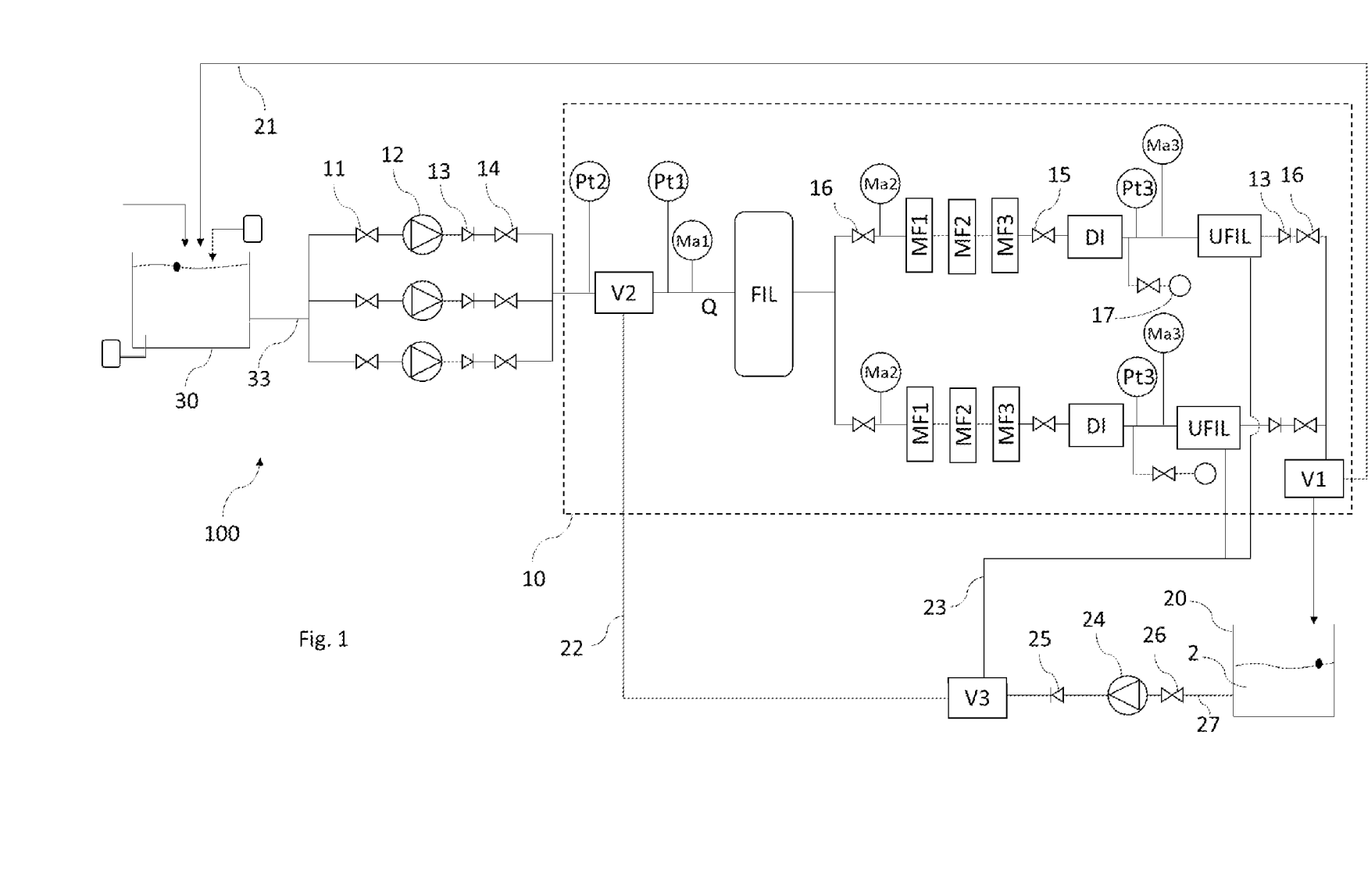
FIG. 1: a diagrammatical view of an embodiment of the treatment system according to the invention.

The system 100 comprises at least one pumping line. The pumping line comprises at least one means of pumping designed to displace a flow rate Q from the first tank 30 via the fluidic outlet 33 to the second tank 20 by the fluidic treatment circuit 10.

The pumping line preferably comprises a fluidic pump 12 that makes it possible to aspirate and discharge a liquid.

In the rest of the description, the term "upstream" or "downstream" in reference to another element, means arranged respectively before or after this element in the direction of fluidic flow.

In an embodiment, the pumping line comprises an inlet valve 11 arranged upstream from the fluidic pump 12. The inlet valve 11 is a shut-off valve.

The pumping line can also comprise a non-return valve 13. The non-return valve 13 advantageously makes it possible to prevent the liquid present in the fluidic treatment circuit 10 from returning to the first receiving tank 30 for gray water, in particular when the pump 12 is not activated.

The pumping line also comprises an outlet valve 14. The outlet valve 14 of the pumping line is arranged downstream from the fluidic pump 12. The outlet valve 14 is preferably a solenoid valve, i.e. an electrically controlled valve.

The non-return valve 13 is preferably arranged downstream from the pump 12 or between the pump 12 and the outlet valve 14. Such an arrangement advantageously makes it possible to prevent the returning of the liquid in the pump 12, in particular during the closing of the outlet valve 14.

In an embodiment, shown in FIG. 1, the system 100 comprises two, three or at least three pumping lines such as described hereinabove arranged in parallel.

A plurality of pumping lines in parallel advantageously makes it possible to modulate the flow rate Q in the fluidic treatment circuit. Each pumping line can be activated or deactivated using inlet valves and/or outlet valves 14. The flow rate of each pumping line can be modulated using the power of the pump 12 or outlet valves 14.

Filtering

The fluidic treatment circuit 10 is more particularly described hereinbelow in reference to FIG. 1.

The fluidic treatment circuit 10 is fluidically connected to the pumping line or lines. The fluidic treatment circuit 10 therefore receives as fluidic inlet the gray water coming from the fluidic outlet 33 of the first tank.

The fluidic treatment circuit 10 comprises a filtration unit FIL. The filtration unit FIL allows for a first filtering of the flow rate Q. The filtration unit FIL is preferably designed for colloidal elements such hairs or hair present in the gray water. The filtration unit FIL also allows for the filtration of smaller elements.

The filtration unit FIL can comprise a paper filter or a sand filter. More preferably, the filtration unit FIL comprises a glass filter media. The glass filter media comprises a matrix of glass pellets.

The glass filter media makes it possible to retain all the particles that are too big to pass through it. The quality of the filtration can be improved by adding a flocculant. The flocculant advantageously makes it possible to reduce the spaces between the pellets. In an embodiment, the glass pellets are pellets of which the surface is polished. The polished surface of the pellets advantageously makes it possible to reduce the risk of the formation of bacteria in the filtration unit FIL.

In an embodiment, the filtration fineness is comprised between 50 µm and 10 µm. Preferably, the filtration fineness is about 30 µm.

The term "filtration fineness" means the average value of the interstices between the pellets. The filtration fineness is measured by measuring the dimensions of the largest particles that the filtrate is comprised of at the end of the filtration.

Micro-Filtration

The fluidic treatment circuit 10 comprises a microfiltration unit. The microfiltration unit comprises at least one microfilter MF1, MF2, MF3. The finesse or the porosity of said at least one microfilter MF1, MF2, MF3 is less than that of the filtration unit FIL.

The microfiltration unit is preferably arranged downstream from the filtration unit FIL. The microfiltration unit advantageously makes it possible to filter the flow rate Q in the fluidic circuit with a filtering fineness less than that of the filtration unit FIL. The microfiltration unit advantageously makes it possible to separate the from the liquid the microparticles that were not filtered by the filtration unit FIL.

The at least one microfilter MF1, MF2, MF3 allows for a separation of the liquid and of the microparticles bi sieving. Preferably, the at least one microfilter MF1, MF2, MF3 comprises a porous membrane. The pores of the porous membrane allow for the passage of the liquid while still retaining the particles that have dimensions greater than the dimensions of said pores.

In an embodiment shown in FIG. 1, the microfiltration unit comprises several microfilters MF1, MF2, MF3 in series. Preferably, the different microfilters MF1, MF2, MF3 in series comprise a different porosity.

In an embodiment, the microfilters MF1, MF2, MF3 are arranged in series in the fluidic treatment circuit 10 degressively. The microfilters MF1, MF2, MF3 in series allow for a degressive filtering in several steps of the flow rate Q.

"Degressively" means that each microfilter in series comprises a porosity less than the adjacent upstream microfilter. Preferably, each microfilter in series comprises a porosity comprised between 2 µm and 15 µm less than the porosity of the adjacent upstream microfilter.

This arrangement of degressive filters advantageously allows for a high level filtration of the flow rate Q considerably reducing the wear and clogging of the microfilters. The service life of the microfilters MF1, MF2, MF3 is thus advantageously increased.

In a preferred embodiment, the microfiltration unit comprises 3 microfilters MF1, MF2, MF3 of which:
 a first microfilter MF1 of which the porosity is about 25 µm;
 a second microfilter MF2 downstream from the first microfilter MF1 of which the porosity is about 10 µm; and
 a third microfilter MF3 downstream from the second microfilter MF2 of which the porosity is about 5 µm.

The applicant has observed that this particular embodiment advantageously made it possible to obtain satisfactory efficiency of the final microfiltration while still reducing the soiling speed of the microfilters.

Disinfection Unit

The fluidic treatment circuit 10 comprises a disinfection unit DI. The disinfection unit DI is preferably arranged downstream from the microfiltration unit, but the disinfection unit DI can also be arranged upstream from the filtration unit FIL or between two microfilters MF1, MF2, MF3 of the microfiltration unit.

The disinfection unit DI makes it possible to remove or to kill the micro-organisms such as germs and microbes or to inhibit the growth of germs.

In a first embodiment, the disinfection unit DI can include means for heating. The means for heating are designed to heat the flow rate Q to a boiling temperature of the liquid.

In a second embodiment, the disinfection unit DI comprises a means for injecting ozone.

In a third embodiment, the disinfection unit DI comprises means for the verdunization of the flow rate by means of chlorine gas.

In a preferred embodiment, the disinfection unit DI comprises a source of ultra-violet light. The disinfection unit DI comprises a tank, preferably in the shape of a cylinder, comprising a source of ultraviolet light extending over at least half of the length of the tank. This arrangement advantageously makes it possible to disinfect the flow rate Q as a continuous flow by minimizing the supply of energy in relation to heating and by reducing the risk of a chemical accident with respect to the injection of ozone.

Membrane Ultrafiltration Unit

The fluidic treatment circuit 10 comprises a membrane ultrafiltration unit UFIL. The ultrafiltration unit UFIL allows for the separation of bacteria, yeasts and of a portion of the viruses present in the flow rate Q. The ultrafiltration advantageously makes it possible to remove the materials dissolved in the water.

Preferably, the membrane ultrafiltration unit UFIL is arranged downstream from the filtration unit FIL and downstream from the disinfection unit DI.

The ultrafiltration unit UFIL comprises a membrane filter through which the flow rate Q passes under the effect of the pressure retaining the materials dissolved in the water.

Figure 3:
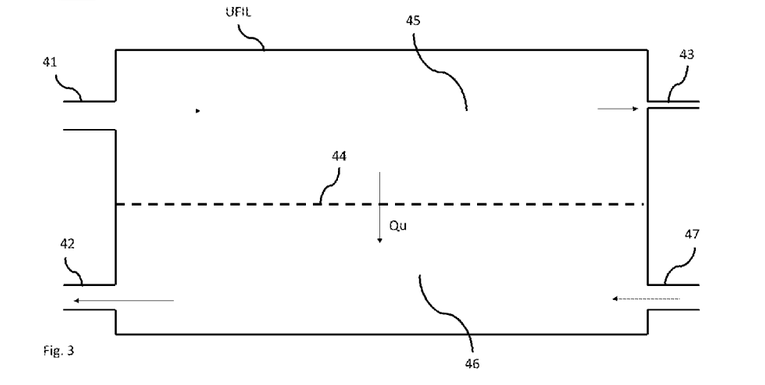
FIG. 3: a diagrammatical view of the ultrafiltration unit

In an embodiment shown in FIG. 3, the membrane ultrafiltration unit UFIL comprises a reverse osmosis device.

The reverse osmosis device comprises two adjacent conduits: a first conduit 45 and a second conduit 46. The first and the second conduits are separated by an ultrafiltration membrane 44.

The first conduit 45 comprises a first fluidic inlet 41 of a flow rate Q of microfiltered and disinfected water. The first fluidic inlet 41 is connected downstream from the filtration unit FIL and/or downstream from the microfiltration unit.

The second conduit 46 comprises a second fluidic inlet 47 of treated water. The second fluidic inlet 47 can be connected to a supply circuit 23 described hereinafter. The second fluidic inlet 47 can be connected to a drinking water circuit.

The pressure in the first conduit 45 is greater than the pressure in the second conduit 46. The difference in pressure between the first conduit 45 and the second conduit 46 is preferably greater than the osmotic pressure.

The difference in pressure and the difference in concentration of dissolved material in the first and the second conduits cause the crossing of the membrane 44 by the water molecules of the first conduit 45 by reverse osmosis.

The second conduit 46 therefore recovers in fluidic outlet 42 the flow coming from the second inlet 47 and the flow of water, noted as Qu, having passed through the membrane 44.

The fluidic outlet 43 of the first conduit 45 comprises the soluble substances in a concentration greater than the concentration of the flow entering into the first fluidic inlet 41.

Preferably, the first conduit 45 and the second conduit 46 are arranged countercurrent.

In a preferred embodiment, said treated water injected by the second fluidic inlet 47 comes from the second tank 20. The system 100 comprises a means of fluidic connection between the second tank 20 and the second fluidic inlet 47 of treated water from the reverse osmosis device.

Preferably, the fluidic outlet 43 of the first conduit 45 is intended to be connected to a recovery container or intended to be connected to the sewer.

The fluidic outlet 42 of the second conduit 46 is preferably fluidically connected to the second tank 20.

The second tank 20 is arranged downstream from the fluidic treatment circuit 10 and downstream from the ultrafiltration unit UFIL, in particular downstream from the fluidic outlet 42 of the second conduit 46.

Pressure-Maintaining Tank

In an embodiment, the system 100 comprises a pressure-maintaining tank 17. The pressure-maintaining tank 17 is connected as a by-pass with the fluidic treatment circuit 10. The pressure-maintaining tank 17 makes it possible to maintain a pressure in the fluidic treatment circuit 10 during the cutting off or the re-opening of the fluidic treatment circuit 10. Preferably, the system 100 comprises a valve upstream from the pressure-maintaining tank 17. Such a valve advantageously makes it possible to activate or deactivate the function of the pressure-maintaining tank 17.

Lines in Parallel

The fluidic treatment circuit 10 can comprise at least two microfiltration units in parallel. The fluidic treatment circuit 10 can comprise at least two disinfection units in parallel. The fluidic treatment circuit 10 can comprise at least two ultrafiltration units in parallel.

In an embodiment shown in FIG. 1, the fluidic treatment circuit 10 comprises two treatment lines in parallel. The treatment lines are each connected to the filtration unit FIL. The treatment lines are connected together downstream from the ultrafiltration units. Each parallel line comprises a microfiltration unit, a disinfection unit DI and an ultrafiltration unit UFIL.

The presence of several lines in parallel advantageously makes it possible to increase the total flow rate of treated water at the outlet of the fluidic treatment circuit. The presence of several lines in parallel also makes it possible to cut off a line in case of leakage, breakdown or clogging of microfilters or of the microfiltration unit. The presence of several lines in parallel therefore advantageously makes it possible to reduce the risk of a total breakdown of the system 100 by having the possibility of cutting off only the defective line.

Preferably, the fluidic treatment circuit 10 or each treatment line comprises an inlet valve 16 fluidically arranged between the filtration unit FIL and the microfiltration unit. The inlet valve 16 advantageously makes it possible to cut off the treatment line or the fluidic treatment circuit 10 in case of a breakdown, leak or clogging of the microfilters.

Preferably, the fluidic treatment circuit 10 or each treatment line comprises an outlet valve 16 fluidically arranged between the second tank 20 and the ultrafiltration unit UFIL.

The fluidic treatment circuit 10 or each treatment line can comprise a solenoid valve 15. The solenoid valve 16 thus authorizes the controlled cutoff of the fluidic treatment circuit 10 or of a treatment line. In an embodiment, the solenoid valve 15 is fluidically arranged between the microfiltration unit and the disinfection unit DI.

Preferably, the fluidic treatment circuit 10 or each treatment line comprises a non-return valve 13. The non-return valve 13 advantageously makes it possible to prevent the return of the treated water inside the ultrafiltration, in particular during the stopping of the fluidic treatment circuit 10 via the closing of a valve.

Second Receiving Tank for Treated Water

The second receiving tank 20 for treated water is intended to receive an outlet flow rate of the fluidic treatment circuit 10.

The second receiving tank 20 for treated water is intended to be connected to a water network for the domestic use thereof, for example for the flushing of toilets, watering and/or the cleaning of outdoor surfaces.

Return Circuits

In an embodiment, the system 100 comprises a first fluidic return circuit 21. The first fluidic return circuit 21 makes it possible to transport the treated water from the outlet of the fluidic treatment circuit 10 or from the second tank 20 to the first tank 30.

This first return circuit 21 advantageously makes it possible to fill the first tank 30, in particular when the level of filling of the first tank 30 is insufficient.

Indeed, for optimized operation, the level of the first tank 30 has to constantly be close to the level of the weir 38 in order to remove the suspended materials in the first volume of water 1.

Preferably, the first return circuit 21 comprises a first 3-way valve V1. The first three-way valve V1 is fluidically arranged between the fluidic treatment circuit 10 and the second tank 20. The first 3-way valve V1 makes it possible to transport the flow rate coming from the fluidic treatment circuit 10 either to the second tank 20, or to the first return circuit 21 and therefore to the first tank 30. The first 3-way valve V1 is preferably an "all or nothing" 3-way valve. The first 3-way valve V1 is preferably a solenoid valve.

In an embodiment, the treatment system 100 comprises a second return circuit 22. The second return circuit 22 makes it possible to transport the treated water 2 from the second tank 20 to the inlet of the fluidic treatment circuit 10. The term "inlet of the fluidic circuit" means between the pumping line and the filtration unit FIL.

Preferably, the second return circuit 22 comprises a second 3-way valve V2. The second three-way valve V2 is connected to the fluidic treatment circuit 10, preferably fluidically arranged between the pumping line and the filtration unit FIL. The second three-way valve V2 is also connected to the second return circuit 22. The second three-way valve V2 thus advantageously makes it possible to inject at the inlet of the fluidic treatment circuit 10 either liquid coming from the first tank 30 or coming from the second tank 20.

The second return circuit 22 advantageously makes it possible to retreat a volume of water 2 coming from the second tank 20 if the quality of the water 2 of the second tank 20 is not sufficient. The second return circuit 22 also makes it possible to dilute the volume of gray water at the inlet of the fluidic treatment circuit 10 in order to improve the quality of the treated water 2 of the second tank 20.

Preferably, the second return circuit 22 comprises a pump 24. The second return circuit 22 can comprise an opening valve 26. The opening valve 26 of the second return circuit is preferably a solenoid valve. The second return circuit 22 preferably comprises a non-return valve 25. The non-return valve 25 advantageously makes it possible to prevent the liquid from passing directly from the inlet of the fluidic treatment circuit 10 to the second tank 20 when the pump 24 is not activated.

In an embodiment, the second tank 20 can comprise an outlet 27 connected to the second return circuit 22. The second tank 20 can comprise a level sensor. Preferably, the level sensor is a float similar to the float of the first tank 30. The level sensor is designed to detect when the level of the second tank 20 reaches the level of the outlet 27 connected to the second return circuit 22.

In an embodiment, the system 100 comprises a supply circuit 23 of the ultrafiltration unit UFIL. The supply circuit 23 allows for the transport of treated water 2 to the second inlet 47 of the second conduit 46 of the ultrafiltration unit UFIL. Preferably, the supply circuit 23 extends from the second tank 20 to the second inlet 47 of the ultrafiltration unit UFIL.

In an embodiment, the supply circuit 23 comprises a third three-way valve V3 fluidically arranged on the second return circuit 22 between the pump 24 and the second three-way valve V2. This third three-way valve V3 is also connected to the supply circuit 23. Such a configuration advantageously makes it possible to use the same pump 24 for the supply circuit 23 and for the second return circuit 22.

Pressure Sensors

In an embodiment, the system 100 comprises pressure sensors Pt1, Pt2, Pt3, Ma1, Ma2, Ma3.

The pressure sensors Pt1, Pt2, Pt3, Ma1, Ma2, Ma3 can comprise at least one pressure gauge Ma1, Ma2, Ma3 and/or at least one pressure switch Pt1, Pt2, Pt3.

The term "pressure switch" means a device that makes it possible to detect the exceeding of one or several predetermined values of the pressure of the fluid of the fluidic treatment circuit 10. The pressure switch Pt1, Pt2, Pt3 is designed to generate information according to a predefined threshold or thresholds that have been reached by the pressure of the fluid. The information generated is preferably electrical information, but can alternatively comprise pneumatic, hydraulic or electronic information.

The term "pressure gauge" means particularly a means of measuring the fluidic pressure at a point of the fluidic treatment circuit 10. The pressure gauge Ma1, Ma2, Ma3 makes it possible to generate a value of the measured pressure. The pressure gauge is designed to generate information according to the value of the pressure of the fluid.

The pressure sensors make it possible to generate information pertaining to the pressure of the fluid at one or different points of the fluidic treatment circuit 10. As described hereinafter, this information can be transmitted to an automatic control unit for controlling pumps and/or solenoid valves of the fluidic treatment circuit 10.

In an embodiment, the fluidic treatment circuit 10 comprises a first pressure sensor arranged in such a way as to detect a pressure of the fluid of the flow rate Q.

The fluidic circuit comprises a pressure sensor fluidically arranged between the pumping line or lines and the filtration unit FIL.

The fluidic treatment circuit 10 can comprise a first pressure sensor upstream from the filtering unit. The fluidic treatment circuit 10 preferably comprises a first pressure switch Pt1 and/or a first pressure gauge Ma1 fluidically between the pumping line or lines and the filtration unit FIL. In an embodiment, the first pressure switch Pt1 and/or the first pressure gauge Ma1 are fluidically arranged between the second three-way valve V2 and the filtration unit FIL.

The fluidic treatment circuit 10 can also comprise a second pressure switch Pt2 fluidically arranged between the pumping line or lines and the second three-way valve V2 of the second return circuit 22.

Preferably, the fluidic treatment circuit 10 comprises a second pressure gauge Ma2 fluidically arranged between the filtration unit FIL and the microfiltration unit. If the fluidic treatment circuit 10 comprises several treatment lines such as described hereinabove, the fluidic circuit preferably comprises a second pressure gauge Ma2 per treatment line.

Preferably, the fluidic treatment circuit 10 comprises a third pressure switch Pt3 and/or a third pressure gauge Ma3 fluidically arranged between the disinfection unit DI and the ultrafiltration unit UFIL.

The pressure switches Pt1, Pt2, Pt3 advantageously make it possible to detect an increase or a drop in pressure on the fluidic treatment circuit 10. The pressure gauges Ma1, Ma2, Ma3 advantageously make it possible to ensure visual follow-up and/or a quantitative follow-up of the pressure. The pressure gauges Ma1, Ma2, Ma3 also advantageously make it possible to take over in case of a breakdown of the pressure switches.

Automatic Control Unit

Figure 5:
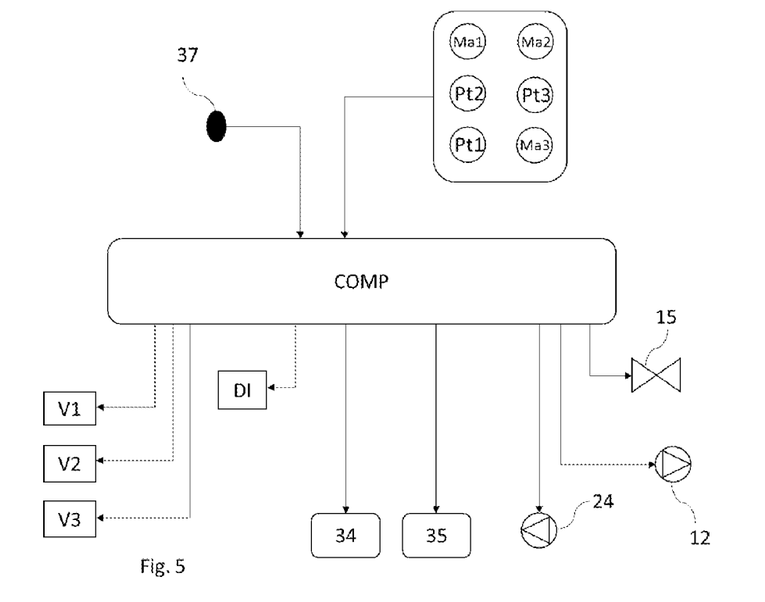
FIG. 5: a diagrammatical view of the automatic control unit and its connections according to an embodiment of the invention.

In an embodiment shown in FIG. 5, the system 100 comprises an automatic control unit COMP.

The automatic control unit is configured to control the activation of at least one pump 12, 24 and/or of at least one valve 14, 15, 26, V1, V2, V3 of the treatment system 100.

The automatic control unit is configured to receive the pressure information from the pressure sensors Pt1, Pt2, Pt3, Ma1, Ma2, Ma3. The automatic control unit is preferably connected to the at least one pressure switch and/or to the at least one pressure gauge.

The automatic control unit is preferably configured to receive the data from the level sensor 37 of the first tank 30.

Using the information received, the automatic control unit is designed and configured to control the different solenoid valves and/or the pumps and optionally the element for oxygenating, the means for delivering enzymes and the disinfection unit DI.

The automatic control unit COMP is preferably configured to control the at least one pump 12 of the pumping line or lines.

The automatic control unit COMP is configured to control at least one solenoid valve of the fluidic treatment circuit 10. The automatic control unit COMP can be configured to control at least one pump to supply the fluidic treatment circuit 10 and/or a pump of the second return circuit.

In an embodiment, the automatic control unit is configured to control the solenoid valves of the fluidic treatment circuit 10 or of each treatment line.

Preferably, the automatic control unit is configured to automatically close the solenoid valve 15 of the fluidic treatment circuit 10 according to the pressure information, in particular from the third pressure switch Pt3 and/or from the third pressure gauge Ma3. For example, if the pressure along a treatment line increases or decreases and exceeds a predefined threshold, it is likely that a unit is clogged respectively downstream or upstream from the pressure sensor. The automatic control unit COMP then controls the closing of said treatment line as a response according to the threshold crossing of a pressure measured at one of the pressure switches or pressure gauges.

The automatic control unit COMP can be configured to control the output solenoid valve or valves 14 of the pumping line or lines, preferably according to the state of the number of treatment lines open and according to the level of filling of the first tank.

For example, the automatic control unit COMP can cause the closing of a pumping line if a treatment line has been closed. This advantageously makes it possible to adapt the pressure in the fluidic treatment circuit 10 by modulating the number of open or closed pumping lines.

In the same way, the automatic control unit COMP is configured to control the operation, stopping or the power of the pumps 12 of the pumping lines.

The automatic control unit COMP also makes it possible to control the first return circuit 21. The automatic control unit COMP is configured to control the opening of the first three-way valve V1 to the return circuit according to the level of filling of the first tank 30.

For example, when the level of filling of the first tank 30 is not sufficient to reach the weir, the float transmits the associated information to the automatic control unit. As a response, the automatic control unit automatically activates the solenoid valve V1 in such a way as to open the channel making it possible to transport the flow rate exiting from the fluidic treatment circuit 10 to the first tank 30 through the first return circuit.

In an embodiment, the automatic control unit COMP is configured to control the second return circuit 22, in particular by controlling the activation of the pump 24, of the inlet solenoid valve 26 and/or of the second three-way valve V2. The automatic control unit COMP controls the second return circuit 22 preferably according to the information from the first pressure switch Pt1, the filling rate of the second tank 20, the filling rate of the first tank 30.

In an embodiment, the second return circuit 22 can also be controlled according to information on the quality of the treated water 2 in the second tank 20 and/or of the quality of the gray water 1 of the first tank 30. In an embodiment, the first tank 30 and/or the second tank 20 comprises sensors for measuring the quality of the water. The information on qualities can be transmitted to the automatic control unit COMP. The automatic control unit COMP can determine the opening of the first return circuit 21 and/or of the second return circuit 22 according to information on the quality of the water of the first tank 30 and/or of the second tank 20.

For example, if the quality of the treated water 2 is not satisfactory, the automatic control unit COMP can activate, automatically after a measurement, the second return circuit 22 by opening the inlet solenoid valve 26, the pump 24 and the three-way solenoid valve V2 in order to reinject the treated water 2 into the fluidic treatment circuit.

In the same way, if the quality of the gray water 1 of the first tank is excessively poor, the activation of the second return circuit is automatically controlled by the automatic control unit COMP in order to dilute the gray water before the fluidic treatment circuit.

The automatic control unit COMP can also be used to control the system 100 in other configurations. For example, the automatic control unit COMP can be configured to activate cleaning steps of the filtration unit FIL.

Figure 6:
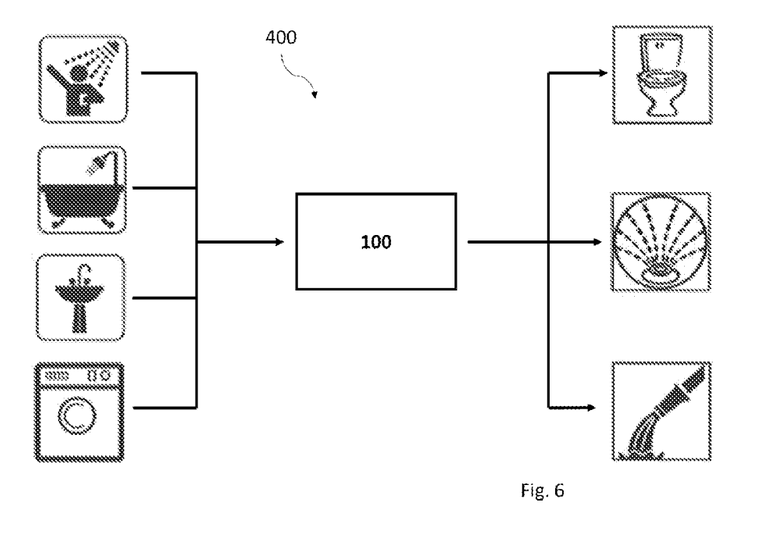
FIG. 6: a diagrammatical view of a domestic fluidic installation comprising a treatment system according to the invention.

The invention also relates to a domestic installation 400. The domestic installation 400 shown in FIG. 6 comprises a removal of gray water. The removal of gray water is connected to the water drains such as the drains of a shower, bathtub, sink (in particular bathroom sink) and/or clothes washing machine. The domestic installation comprises, furthermore, a treatment system 100 according to the present invention. The domestic installation comprises, furthermore, a water supply. The water supply can comprise the water supply of toilet flushing water, watering circuit, irrigation circuit or the supply of water of an outdoor tap, in particular for the use of washing cars or outdoor surfaces. Said water supply is fluidically connected to the second tank 20 of the treatment system 100.

Figure 4:
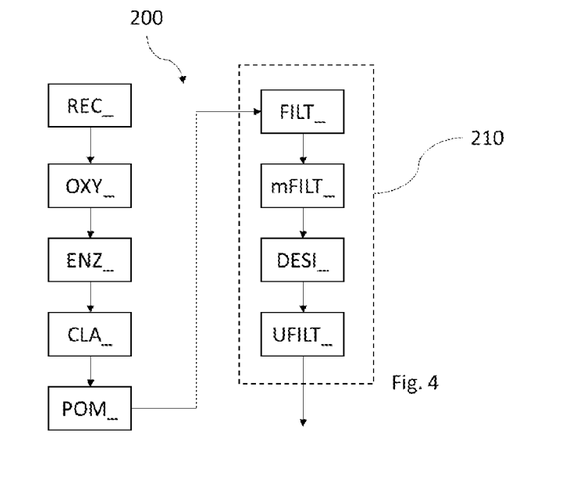
FIG. 4: a flowchart showing an embodiment of the method according to the invention.

The invention also relates to a method for treating and/or recycling gray water shown in FIG. 4. The method comprises the following steps:

The receiving REC_ of a volume of gray water 1 in a first tank 30;

an oxygenation OXY_ of said volume of gray water 1 in the first tank 30;

an injection ENZ_ of a volume of enzyme into said volume of received gray water 1;

the pumping POM_ of a flow rate Q coming from said volume of gray water from the first tank to a fluidic treatment circuit 10; and a treatment 210 of said flow rate Q in a volume of treated water 2 comprising:

a first filtration FILT_ of said flow rate Q through a filter FIL making it possible to retain colloidal particles;

a second filtration m FILT_ of said flow rate Q through at least one microfilter MF1, MF2, MF3, a disinfection DESI_ of said flow rate Q; and a membrane ultrafiltration UFILT_ of said flow rate Q.

In an embodiment, the method comprises a step of clarifying CLA_ of said volume of gray water 1 by the removal of suspended materials in the first tank.

The invention also relates to a method for automatically controlling a system such as the treatment system according to the invention. The method for controlling is preferably implemented by the automatic control unit COMP.

The method for automatically controlling comprises at least one measurement of the pressure of the flow rate Q in the fluidic treatment circuit 10.

In an embodiment, the method comprises at least one measurement of the filling rate of the first tank 30.

In an embodiment, the method comprises a reinjection of a volume of treated water 2 into the fluidic treatment circuit 10 or into the first tank 20. The reinjection is automatically controlled by the automatic control unit COMP according to pressure measurements of the flow rate Q and/or measurements of the filling rate.

In an embodiment, the automatic control unit is offset. The automatic control unit can comprise a computer or a smartphone. The system then comprises means for transmitting information and/or control messages between the system and the automatic control unit.

The invention also relates to a computer program product comprising computer program code instructions for implementing the control method according to the invention and a recording support on which such a code is recorded.

The invention claimed is:

1. A system for treating and/or recycling gray water, comprising a first receiving tank for gray water, a second receiving tank for treated water and a fluidic treatment circuit between the first and second receiving tanks, wherein the first receiving tank comprises an element for oxygenating the gray water in the first receiving tank and a means for delivering enzymes into the first receiving tank, and wherein the fluidic treatment circuit comprises:

a filtration unit;

a microfiltration unit comprising at least one microfilter;

a disinfection unit; and a membrane ultrafiltration unit the fluidic treatment circuit further comprising a plurality of pressure sensors to transmit pressure information to an automatic control unit, at least a first pressure sensor of the plurality of pressure sensors being located upstream from the filtration unit and at least a second pressure sensor of the plurality of pressure sensors fluidically arranged between the filtration unit and the ultrafiltration unit, the automatic control unit controlling closure of a treatment line responsive to a pressure measured by at least one of the first and second pressure sensors crossing a threshold;

the first receiving tank comprises a level sensor to transmit to the automatic control unit filling information of the first receiving tank and the automatic control unit controls the closure of the fluidic treatment circuit according to the filling information;

the fluidic treatment circuit comprises a pump controlled by said automatic control unit according to the filling information of the first receiving tank, and the element for oxygenating and the means for delivering enzymes into the first receiving tank is controlled by the automatic control unit according to the filling information of the first receiving tank transmitted by the level sensor.

2. The system according to claim 1, wherein, the plurality of pressure sensors is adapted to transmit pressure information to the automatic control unit and the automatic control unit controls the closure of the fluidic treatment circuit at least in part according to the pressure information.

3. The system according to claim 2, wherein the pump and/or at least one solenoid valve of the fluidic treatment circuit is configured to be controlled by said automatic control unit according to the pressure or filling information transmitted.

4. The system according to claim 1, further comprising a second fluidic return circuit for injecting the treated water at an inlet of the fluidic treatment circuit to dilute the gray water from the first receiving tank at the inlet of the fluidic treatment circuit, said inlet of the fluidic treatment circuit being situated between the pump and the filtration unit.

5. The system according to claim 1, wherein the fluidic treatment circuit comprises at least two microfiltration units and/or at least two disinfection units and/or at least two membrane ultrafiltration units in parallel.

6. The system according to claim 1, further comprising an element for clarifying for removing suspended materials in the first receiving tank.

7. The system according to claim 6, wherein the suspended materials are removed in the first receiving tank by discharge of an overflow into a spillway or by scraping.

8. The system according to claim 7, further comprising a first fluidic return circuit for injecting the treated water into the first receiving tank to maintain the first receiving tank at a level of filling corresponding to the element for removing the suspended materials.

9. The system according to claim 4, wherein the solenoid valve is controlled by the automatic control circuit at least in part according to the pressure information.

10. The system according to claim 1, wherein the means for delivering enzymes comprise a pump or distributor.

11. The system according to claim 1, wherein the element for oxygenating the gray water comprises an air outlet.

12. The system according to claim 1, wherein the second pressure sensor is fluidically arranged between the disinfection unit and the ultrafiltration unit.

13. The system according to claim 1, wherein the disinfection unit is configured to heat fluid in the fluidic treatment circuit to a boiling temperature of said fluid in the fluidic treatment circuit.

14. The system according to claim 1, wherein the disinfection unit is configured to chlorinate fluid in the fluidic treatment circuit using chlorine gas.

15. The system according to claim 8, comprising a second fluidic return circuit for injecting the treated water to an inlet of the fluidic treatment circuit to dilute the gray water from the first receiving tank at an inlet of the fluidic treatment circuit, wherein said inlet of the fluidic treatment circuit is situated between the pump and the filtration unit, the second receiving tank comprises a level sensor to detect when a filling level of the second receiving tank reaches a level corresponding to an outlet from the second receiving tank into the second fluidic return circuit, the automatic control unit is configured to control the first fluidic return circuit to maintain the first receiving tank at the level of filling corresponding to the element for removing the suspended materials, and the automatic control unit is configured to control the second fluidic return circuit to maintain the second receiving tank at or beyond a level of filling corresponding to the outlet from the second receiving tank into the second fluidic return circuit.

16. The system according to claim 4, wherein the second receiving tank comprises a level sensor to detect when a filling level of the second receiving tank reaches a level corresponding to an outlet from the second receiving tank into the second fluidic return circuit.

17. The system according to claim 4, wherein the first pressure sensor is arranged between the filtration unit and a junction of the fluidic treatment circuit and the second fluidic return circuit.

18. The system according to claim 17, comprising a third pressure sensor of the plurality of pressure sensors arranged between the pump and the junction of the fluidic treatment circuit and the second fluidic return circuit.

19. A method for treating and/or recycling gray water, comprising:
  receiving a volume of gray water in a first tank;
  oxygenating said volume of gray water in the first tank;
  injecting a volume of enzyme into said volume of gray water;
  pumping a flow rate coming from said volume of gray water from the first tank to a fluidic treatment circuit; and
  treating said flow rate in a volume of treated water comprising:
    a first filtration of the flow rate through a filter to retain colloidal particles;
    a second filtration of said flow rate through at least one microfilter;
    a disinfection of said flow rate; and
    a membrane ultrafiltration of said flow rate;
  measuring pressure in the fluidic treatment circuit by a first pressure sensor located upstream from the filter and measuring pressure in the fluidic treatment circuit by a second pressure sensor fluidically arranged between the filter and the membrane ultrafiltration unit; and
  transmitting filling information of the first tank from a level sensor and pressure information to an automatic control unit controlling closure of a treatment line at least in part according to the filling information of the first tank and responsive to a pressure measured by at least one of the first and second pressure sensors crossing a threshold;

wherein injecting the volume of enzymes and oxygenating are performed according to the filling information of the first tank transmitted by the level sensor.

20. A method for automatic control of a system for treating and/or recycling gray water, said system comprising:
- a first receiving tank for gray water, comprising an element for oxygenating the gray water in the first receiving tank and a means for delivering enzymes into the first receiving tank,
- a second receiving tank for treated water, and
- a fluidic treatment circuit between the first and second receiving tanks, comprising:
  - a filtration unit;
  - a microfiltration unit comprising at least one microfilter;
  - a disinfection unit;
  - a membrane ultrafiltration unit;
  - a plurality of pressure sensors to transmit pressure information to an automatic control unit, at least a first pressure sensor of the plurality of pressure sensors being located upstream from the filtration unit and at least a second pressure sensor of the plurality of pressure sensors fluidically arranged between the filtration unit and the ultrafiltration unit, the automatic control unit controlling closure of a treatment line responsive to a pressure measured by at least one of the first and second pressure sensors crossing a threshold;

the first receiving tank comprises a level sensor to transmit to the automatic control unit filling information of the first receiving tank and the automatic control unit controls the closure of the fluidic treatment circuit according to the filling information;

the fluidic treatment circuit comprises a pump controlled by said automatic control unit according to the filling information of the first receiving tank, and the element for oxygenating and the means for delivering enzymes into the first receiving tank is controlled by the automatic control unit according to filling information of the first receiving tank transmitted by the level sensor;

wherein the automatic control unit takes:
- at least one measurement of the pressure of a flow rate in the fluidic treatment circuit;
- at least one measurement of a filling rate of the first receiving tank; and
- a reinjection of a volume of the treated water into the fluidic treatment circuit or into the first tank according to the at least one measurement of the pressure of the flow rate and/or the at least one measurement of the filling rate.

* * * * *